US012001603B2

(12) United States Patent
Korphi et al.

(10) Patent No.: US 12,001,603 B2
(45) Date of Patent: Jun. 4, 2024

(54) ACTUATING A CONTACT LENS USING MILLIMETER ELECTROMAGNETIC WAVES

(71) Applicant: Google LLC, Mountain View, CA (US)

(72) Inventors: Sean Patrick Korphi, San Carlos, CA (US); Mohammad Reza Ghajar, Redwood City, CA (US); Fei He, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 780 days.

(21) Appl. No.: 17/096,072

(22) Filed: Nov. 12, 2020

(65) Prior Publication Data

US 2021/0149484 A1 May 20, 2021

Related U.S. Application Data

(63) Continuation of application No. PCT/US2019/061830, filed on Nov. 15, 2019.

(51) Int. Cl.
*G02C 7/04* (2006.01)
*A61B 3/00* (2006.01)
(Continued)

(52) U.S. Cl.
CPC ............... *G06F 3/013* (2013.01); *G02B 7/08* (2013.01); *G02B 7/09* (2013.01); *G02C 7/04* (2013.01); *G03B 3/10* (2013.01); *G06F 3/017* (2013.01)

(58) Field of Classification Search
CPC ........... A61B 3/02; A61B 3/102; A61B 3/025; A61B 3/113; A61B 3/1015; A61B 3/1225;
(Continued)

(56) References Cited

U.S. PATENT DOCUMENTS 10,314,530 B2 * 6/2019 Pugh .................... A61B 5/4812
2018/0275429 A1 9/2018 Pugh et al.
(Continued)

FOREIGN PATENT DOCUMENTS

EP 2846183 3/2015
WO 2015191240 12/2015
WO 2018115819 6/2018

OTHER PUBLICATIONS

"International Preliminary Report on Patentability", Application No. PCT/US2019/061830, dated May 17, 2022, 10 pages.
(Continued)

*Primary Examiner* — Dawayne Pinkney
(74) *Attorney, Agent, or Firm* — Colby Nipper PLLC

(57) ABSTRACT

The present disclosure describes systems and techniques directed to detecting a user's gaze and using millimeter electromagnetic waves to actuate a focus system of a contact lens worn by the user. The described systems and techniques include a contact lens (108) having a focus system (222) and contact lens circuitry (226) that includes transceiver circuitry (228), logic circuitry (230), and memory circuitry (232). The memory circuitry (232) stores instructions of a focus manager application (234) that, when executed by the logic circuitry (230), directs the contact lens (108) to actuate the focus system (222) in response to receiving a signal (110) having a millimeter wave (114).

20 Claims, 6 Drawing Sheets

(51) Int. Cl.
*A61B 3/02* (2006.01)
*A61B 3/10* (2006.01)
*G02B 7/08* (2021.01)
*G02B 7/09* (2021.01)
*G02C 7/00* (2006.01)
*G02C 7/02* (2006.01)
*G03B 3/10* (2021.01)
*G06F 3/01* (2006.01)

(58) Field of Classification Search
CPC ......... A61B 3/1005; A61F 9/026; G02C 7/00; G02C 7/04; G02C 7/02; G02C 7/024
USPC .......... 351/159.03, 200, 205, 206, 209, 210, 351/221, 222, 247, 246, 41, 159.01, 351/159.39, 159.73–159.77
See application file for complete search history.

(56) References Cited

U.S. PATENT DOCUMENTS

| | | | |
|---|---|---|---|
| 2019/0044584 A1* | 2/2019 | Lee | H04B 7/0617 |
| 2019/0175083 A1 | 6/2019 | Cohen et al. | |
| 2019/0282399 A1* | 9/2019 | Goetz | A61B 8/54 |
| 2019/0319355 A1* | 10/2019 | Ko | H01Q 15/10 |
| 2020/0012175 A1* | 1/2020 | Lawrenson | G02C 7/083 |
| 2020/0037313 A1* | 1/2020 | Winoto | G02C 7/04 |
| 2020/0093014 A1* | 3/2020 | Merenda | H04M 1/72412 |

OTHER PUBLICATIONS

"International Search Report and Written Opinion", Application No. PCT/US2019/061830, dated Aug. 3, 2020, 17 pages.

Valenta, et al., "Harvesting Wireless Power: Survey of Energy-Harvester Conversion Efficiency in Far-Field, Wireless Power Transfer Systems", Jun. 2014, pp. 108-120.

* cited by examiner

ACTUATING A CONTACT LENS USING MILLIMETER ELECTROMAGNETIC WAVES

BACKGROUND

Contact lenses are a common remedy for a user experiencing a vision impairment such as myopia (near-sightedness) and presbyopia (far-sightedness). In general, a contact lens refracts light corresponding to an image through the contact lens such that a location of a focal point of the light lies on the retina of an eye. An accurate focal point location brings the image into focus and remedies the vision impairment. The contact lens can do so through a curvature, a thickness, or a material of the contact lens.

Today, "smart" contact lens technology is advancing to introduce into contact lenses features that include sensors for detecting glucose levels in a user's eye, imagers for capturing images and mechanisms for dynamically changing optical properties that impact focal points. Example mechanisms that can be used to dynamically change the optical properties of a smart contact lens include polymer gels having refractive indexes that change with electrical stimulation or films that can expand or contract with electrical stimulation to change a shape or thickness of a smart contact lens.

Current techniques for actuating mechanisms that dynamically change the optical properties of a smart contact lens, however, present several challenges. For example, techniques based on light-based actuation (e.g., light received into a photo-diode) may inadvertently actuate the mechanism if the user is gazing at a bright light, such as a headlight of an automobile. As another example, techniques relying on the user blinking or squinting (e.g., causing a sensed change in a capacitive field) may be inconsistent. Furthermore, current techniques may be independent from a direction of the user's gaze, resulting in the focal point being inaccurate to focus light reflected from objects in the direction of the gaze.

SUMMARY

The present disclosure describes systems and techniques directed to using signals having millimeter waves to actuate a focus system of a contact lens worn by the user. The described systems and techniques include a contact lens having a focus system and contact lens circuitry that includes transceiver circuitry, logic circuitry, and memory circuitry. The memory circuitry stores instructions of a focus manager application that, when executed by the logic circuitry, directs the contact lens to actuate the focus system in response to receiving a signal having millimeter waves.

In some aspects, a contact lens is described. The contact lens includes a focus system, an antenna, and circuitry. The circuitry includes transceiver circuitry, logic circuitry, and memory circuitry. The memory circuitry stores instructions of a focus manager application that, when executed by the logic circuitry, directs the contact lens to receive, through the antenna and transceiver circuitry and from a user equipment (UE), a signal including or consisting of electromagnetic waves that are within a spectrum that corresponds to a millimeter-wave spectrum. The focus manager application also directs the contact lens to determine, in response to receiving the signal, to change a focal length of the contact lens and actuate the focus system to change the focal length of the contact lens.

In some other aspects, a UE is described. The UE includes a focus assistant manager application that, when executed by a processor of the user equipment, directs the user equipment to present an image through a display. The focus assistant manager application also directs the UE to transmit a signal to a contact lens, where the signal includes or consists of electromagnetic waves within a millimeter-wave spectrum. The focus assistant manager application also directs to UE to transmit the signal to the contact lens, directing the contact lens to actuate a focus system of the contact lens to change a focal length of the contact lens.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, a reader should not consider the summary to describe essential features nor limit the scope of the claimed subject matter.

BRIEF DESCRIPTION OF THE DRAWINGS

This document describes details of one or more aspects of detecting a gaze and using millimeter electromagnetic waves to actuate a focus system of a smart contact lens. The use of the same reference numbers in different instances in the description and the figures may indicate like elements.

DETAILED DESCRIPTION

The present disclosure describes systems and techniques directed to detecting a user's gaze and using signals having millimeter waves to actuate a focus system of a contact lens worn by the user. The described systems and techniques include a contact lens having a focus system and contact lens circuitry that includes transceiver circuitry, logic circuitry, and memory circuitry. The memory circuitry stores instructions of a focus manager application that, when executed by the logic circuitry, directs the contact lens to actuate the focus system in response to receiving a signal having millimeter waves.

The described systems and techniques include millimeter-wave compatible wireless-communication hardware in the user equipment and the contact lens. The contact lens includes a focus system and a focus manager application, while the user equipment includes a focus assistant manager application that is complementary to the focus manager application.

The described systems and techniques have multiple advantages over other systems and techniques that use electromagnetic waves other than millimeter waves. As a first example, the described systems and techniques use wireless-communication hardware that has recently become available in UEs (e.g., radar systems and/or Fifth Generation New Radio (5G NR) transceivers), eliminating the need for additional wireless-communication hardware dedicated to the described techniques. As a second example, the described systems and techniques may beamform millimeter waves in a desired direction and to a desired attenuation distance (e.g., a viewing direction and distance between the UE and the contact lens). And, as a third example, the described systems and techniques using the millimeter waves reduce the possibility of non-intentional actuation of the contact lens (e.g., accidental light-based actuation through a photo diode in the contact lens).

While features and concepts of the described systems and techniques can be implemented in any number of different environments, systems, devices, and/or various configurations, aspects are described in the context of the following example devices, systems, and configurations.

Operating Environment

Figure 1:
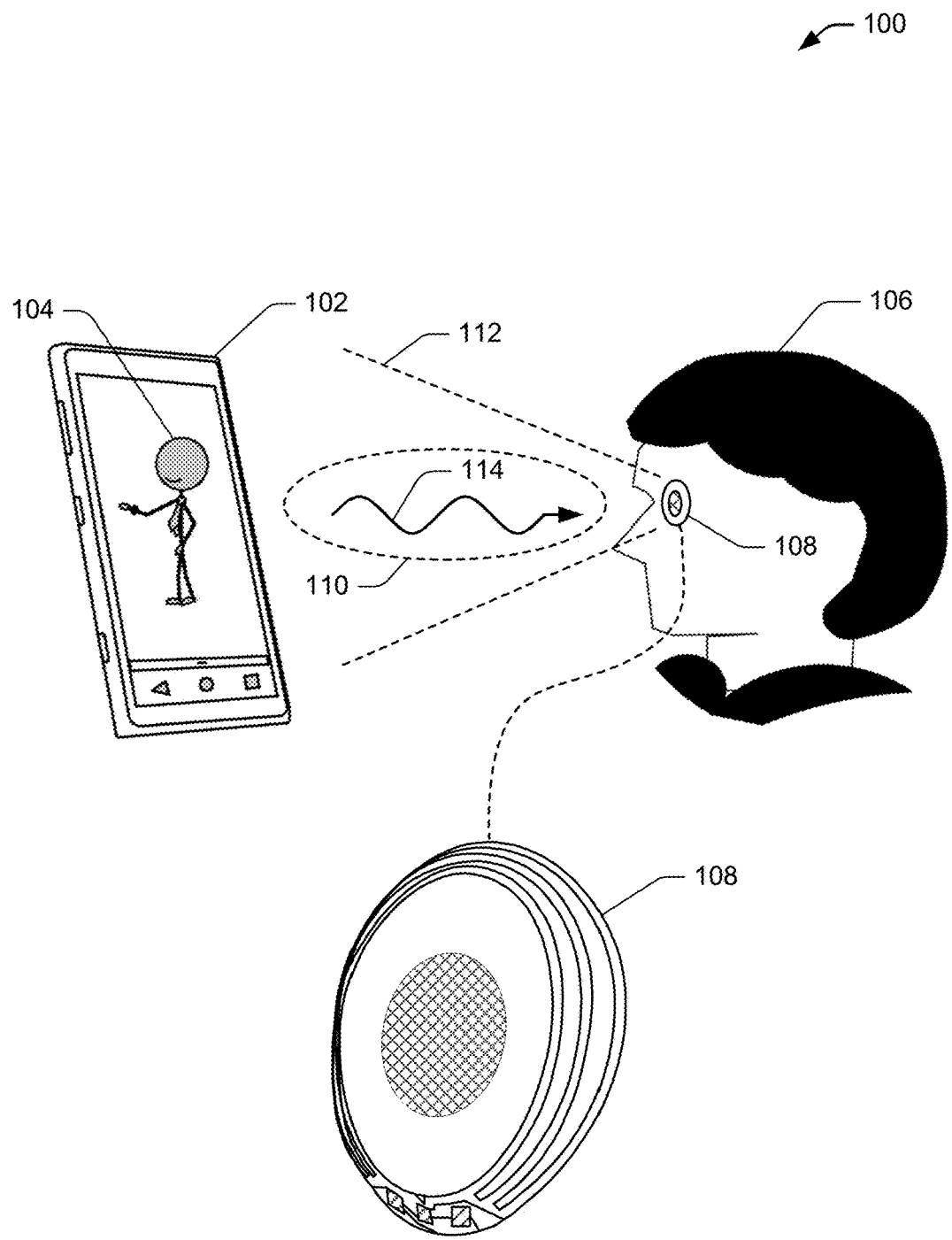
FIG. 1 illustrates an example operating environment in accordance with one or more aspects.

FIG. 1 illustrates an example operating environment 100, which includes a user equipment (UE) 102 presenting an image 104 to a user 106. The user 106 is wearing a contact lens 108 on their eye. The contact lens 108 is a "smart" contact lens, equipped with a focus system to correct vision conditions that may be experienced by the user 106, including presbyopia and/or myopia. The user equipment 102 in FIG. 1 is implemented as a smartphone but may be implemented as any suitable computing device with display capabilities, such as a tablet, a television, a laptop computer, a home automation system display, or an Internet-of-Things (IoT) device.

Within the operating environment 100, the UE 102 determines to transmit a signal 110 to the contact lens 108 to actuate a focus system of the contact lens 108. In some instances, the UE 102 may determine to transmit the signal 110 in response to determining that the user 106 is gazing at the image 104 (e.g., gaze-direction 112). In other instances, the UE 102 may determine to transmit the signal 110 in response to determining that the image 104 is a type of image that the user 106 may desire to view (e.g., the image 104 may be presented through viewer application that is a magnifier application, an e-reader application).

The signal 110 contains electromagnetic waves within a spectrum corresponding to the millimeter-wave spectrum. The millimeter-wave spectrum can range from 30 gigahertz (GHz) to 300 GHz. Electromagnetic waves within the millimeter-wave spectrum (e.g., mmWave 114), can range from 10 millimeters (mm) in length down to 1 mm in length. In response to receiving the signal 110, the contact lens 108 actuates the focus system to change a focal point of the image 104 within the eye of the user 106.

The UE 102 and the contact lens 108 may perform complementary techniques to optimize viewability of the image 104 for the user 106. As an example, the UE 102 may account for signal-receiving capabilities of the contact lens 108 to alter a transmission strength of the signal 110 or shape the signal 110 through beamforming to transmit the signal 110 a direction and attenuate the signal 110 within a range of acceptable viewing distances. As another example, the UE 102 may change a magnification level, a resolution level, or a brightness level of its display based on eyesight capabilities of the user 106 wearing the contact lens 108. And, as yet another example, the contact lens 108 may account for display capabilities of the UE 102 to actuate or alter the focus system of the contact lens 108.

Example Systems

Figure 2:
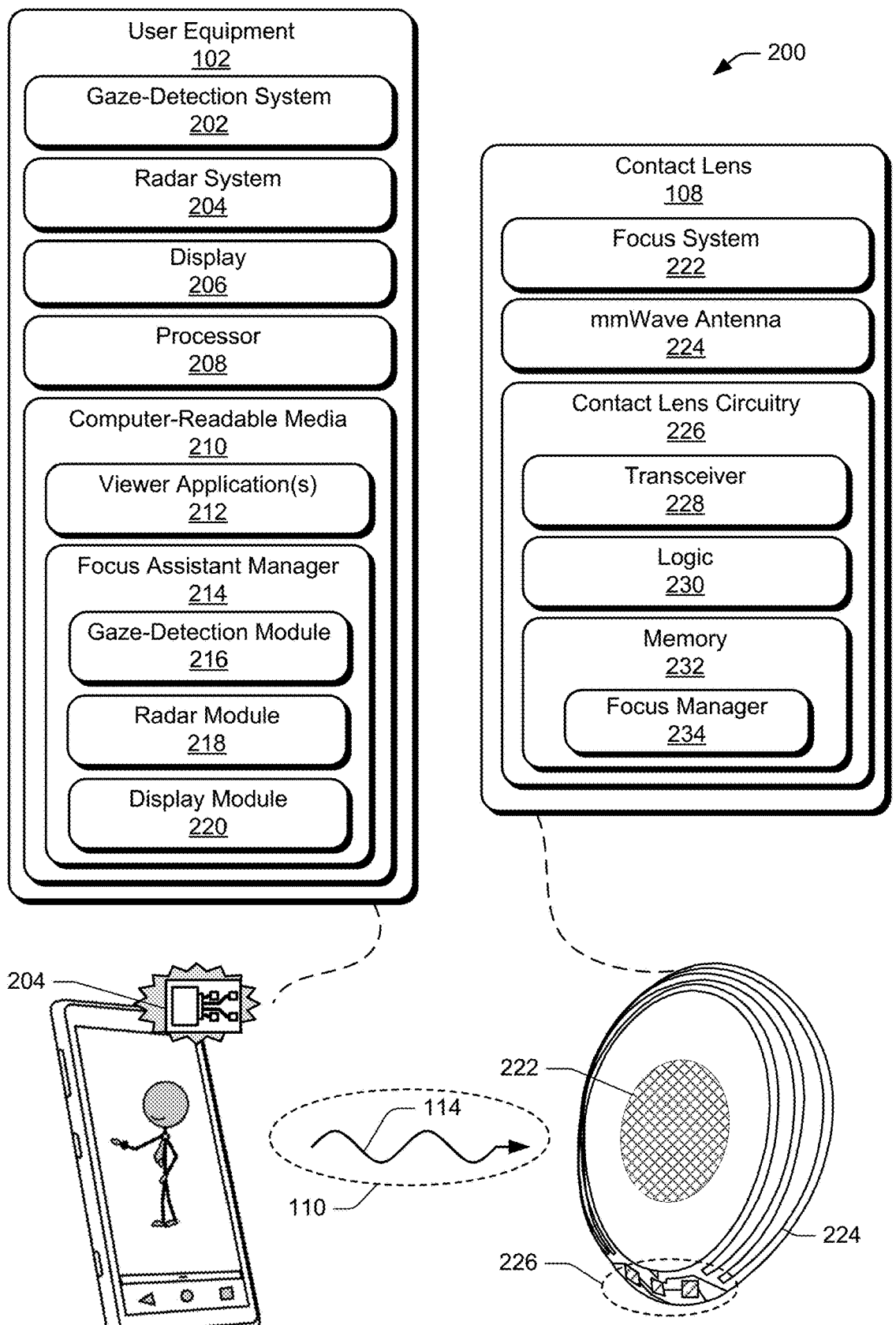
FIG. 2 illustrates example details of a user equipment and an example contact lens in accordance with one or more aspects.

FIG. 2 illustrates an example details 200 of user equipment and an example contact lens in accordance with one or more aspects. The user equipment may be the UE 102 of FIG. 1, while the contact lens may be the contact lens 108 of FIG. 1.

The UE 102 includes a gaze-detection system 202 that can aid in determining that the user 106 is gazing at the UE 102. The gaze-detection system 202 may include elements such as an accelerometer and/or gyroscope to detect motion of the UE 102 (e.g., the user may be picking up UE 102 and gazing at the UE 102), a near-field communication (NFC) device or proximity sensor to detect a presence of the user (e.g., the user may be near the UE 102 gazing at the UE 102), or an image-capture sensor such as charge-couple device (CCD) or complementary metal-oxide semiconductor (CMOS) image sensor (e.g., facial recognition may indicate that the user is gazing at the UE 102). In some instances, the gaze-detection system 202 may include infrared (IR) sensors that detect the presence of a user by detecting body heat.

The user equipment 102 also includes a radar system 204 for transmitting and receiving electromagnetic waves within the millimeter-wave spectrum. The radar system 204 may include multiple elements, including antennas, transceiver circuitry, processing circuitry, and beamforming circuitry. The beamforming circuitry may form beams that are steered or un-steered, wide or narrow, or shaped (e.g., as a hemisphere, cube, fan, cone, or cylinder). The elements of the radar system 204 may, in some instances, be fabricated on a single integrated circuit (IC) component The radar system 204 may substitute or augment portions of the gaze-detection system 202. For example, the radar system 204 may receive a signal (e.g., a signal other than the signal 110 of FIG. 1) from the contact lens 108, indicating that the user 106 is gazing at the UE 102. And, as yet another example, the radar system 204 may use gesture-recognition techniques to distinguish different orientations or gaze directions of the user 106. Such gesture-recognition techniques may include scattering, in a pulsing fashion, a radar field on a target (e.g., the face of the user 106), receiving reflections of the radar field from the target, and processing the received radar field to determine a gesture (e.g., gaze direction of the user 106).

The UE 102 also includes a display 206 for displaying an image (e.g., the image 104). Examples of the display 206 include a light-emitting diode (LED) display, an organic light-emitting diode (OLED) display, and a liquid crystal (LCD) display. The display 206 may be capable of performing zooming and/or magnification operations.

The UE 102 also includes a processor 208 and computer-readable storage media 210 (CRM 210). The processor 208 may be a single-core processor or a multiple-core processor composed of a variety of materials, such as silicon, polysilicon, high-K dielectric, copper, and so on. The computer-readable storage media described herein excludes propagating signals. CRM 210 may include any suitable memory or storage device such as random-access memory (RAM), static RAM (SRAM), dynamic RAM (DRAM), non-volatile RAM (NVRAM), read-only memory (ROM), or Flash memory.

CRM 210 stores applications having executable code, including one or more viewer application(s) 212 (e.g., a media player application, a magnification-reader application, an e-reader application) and a focus assistant manager application 214. The focus assistant manager application 214 includes sub-modules of code (e.g., gaze-detection module 216, radar module 218, display module 220) that, when executed by the processor 208, direct the UE 102 to perform operations described herein.

The CRM 210 may also store parameters, used by the focus assistant manager application 214, to optimize a viewing of the image 104 by the user 106. As a first example, the CRM 210 may store parameters relevant to signal-receiving capabilities of the contact lens 108, such as a received signal strength indicator (RSSI) threshold (e.g., decibels (dB)), an accepted frequency range within the millimeter-wave spectrum, an expected beam diameter, and so on. In some instances, such parameters may be downloaded to the CRM 210 from a cloud-based content provider that is associated with the contact lens 108. In other instances, such parameters may be available to the CRM 210 through millimeter-wave signals exchanging data (e.g., data packets, data frames) between the UE 102 and the contact lens 108. Knowing the signal-receiving capabilities of the contact lens 108, the UE 102 (e.g., the processor 208 executing code of focus assistant manager application 214 and the radar module 218) may alter a transmission strength of the signal 110 or shape the signal 110 through beamforming, attenuating signal 110 within a range of viewing distances that are applicable to a viewing situation (e.g., if the UE 102 were a smartphone having a small display, it would not transmit the signal 110 a thousand meters; conversely, if the UE 102 were a television having a wide display, it would not transmit the signal 110 less than 1 meter). Such viewing distances may be, for example, between 0.0 and 1.0 meters, 0.5 meters and 1.5 meters, 1.0 meters and 3.0 meters, and so on.

As a second example, the CRM 210 may store parameters relevant to eyesight capabilities of the user 106 wearing the contact lens 108 (e.g., eyesight prescription information, a medical condition such as glaucoma, light sensitivity of the user). In some instances, such parameters may be downloaded to the CRM 210 from a medical service provider that is associated with the user 106. In other instances, such parameters may be available to the CRM 210 through millimeter-wave signals exchanging data (e.g., data packets, data frames) between the UE 102 and the contact lens 108. Knowing eyesight capabilities of the user 106 wearing the contact lens 108, the UE 102 (e.g., the processor 208 executing the code of the display module 220) may change a magnification level, a resolution level, or a brightness level of the display 206.

The contact lens 108 includes a focus system 222. The focus system 222 may use one of a variety of mechanisms to change a focal point of an image passing through the contact lens 108 and into an eye of the user 106. As a first example mechanism, the focus system 222 may include a saline-filled bladder made from polymer films that change structure (e.g., expand, contract) when an electrical stimulus (e.g., an electrooculographical potential) is applied to the polymer films. As a second example mechanism, the focus system 222 may include a polymer gel filled bladder, where a refractive index of the polymer gel changes when an electrical or magnetic stimulus is applied to the polymer gel.

The contact lens 108 includes a mmWave antenna 224 and contact lens circuitry 226. The contact lens circuitry 226 includes multiple elements, including transceiver circuitry 228, logic circuitry 230, and memory circuitry 232. In some instances, the contact lens circuitry 226 may be passive, collecting energy from electromagnetic waves to generate power to operate features of the contact lens 108. In other instances, the contact lens circuitry 226 may be active, relying on a battery-storage device that may be included on the smart contact lens. In some aspects, the mmWave antenna 224 and the transceiver circuitry 228 may be a portion of a radio frequency identification (RFID) system that is integrated into the contact lens 108.

The logic circuitry 230 may be based on a single-core processor or a multiple-core processor and composed of a variety of materials, such as silicon, polysilicon, high-K dielectric, copper, and so on. The memory circuitry 232 may be a computer-readable media (CRM) and based on memory cells of a suitable memory device such as random-access memory (RAM), static RAM (SRAM), dynamic RAM (DRAM), non-volatile RAM (NVRAM), read-only memory (ROM), or Flash memory device. The memory circuitry 232 may store executable code of a focus manager application 234 that, when executed by the logic circuitry 230, directs the contact lens 108 to perform operations described herein.

The memory circuitry 232 may also store parameters, used by the logic circuitry 230 executing the focus manager application 234, to optimize a viewing of the image 104 by the user 106. As a first example, the memory circuitry 232 may store parameters that the contact lens 108 can share with the UE 102 to indicate signal-receiving capabilities of the contact lens 108, such as a received signal strength indicator (RSSI) threshold (e.g., decibels (dB)), a supported frequency range within the millimeter-wave spectrum, a supported beam diameter, and so on. In some instances, such parameters may be programmed into the memory circuitry 232 during manufacture of the contact lens 108.

The memory circuitry 232 may store parameters indicating capabilities of the UE 102 displaying the image 104. Such parameters may include a model or configuration of the UE 102, an available signal-transmission power in decibels (dB), an estimated distance between the UE 102 and the contact lens 108 (e.g., determined by the radar system 204 of the UE 102), qualities of the display 206 (e.g., a resolution, an illumination power), available formats of the image 104, and so on. Data frames or data packets carried by the electromagnetic wave(s) 114 of the signal 110 may include the parameters.

The memory circuitry 232 may also store parameters indicating eyesight capabilities of the user 106 wearing the contact lens 108 (e.g., eyesight prescription information, a medical condition such as glaucoma, light sensitivity of the user). In some instances, such parameters may be downloaded to the memory circuitry from a medical service provider that is associated with the user 106.

In some instances, UE 102 may actuate the focus system 222 by applying an electrical stimulus (either actively sourced from a battery or passively sourced from received electromagnetic waves) to the focus system 222. Actuating the focus system 222 may include actuating the focus system 222 to one of multiple, available degrees of actuation, where each degree of actuation corresponds to a different location of a focal point of the image 104 within an eye of the user 106 wearing the contact lens 108. Furthermore, actuating the focus system 222 may be based on the parameters indicating eyesight capabilities of the user 106 wearing the contact lens 108 and/or the parameters indicating capabilities of the UE 102 presenting the image 104.

In general, and further to the descriptions above, the UE 102 and/or the contact lens 108 may provide the user 106 controls to make an election as to both if and when systems, programs, or features described herein to enable and/or disable collection of user information associated with the user 106 (e.g., information about a vision or medical condition of the user 106, focal settings and/or use of the contact lens 108, content of images (e.g., the image 104) being viewed by the user). Such controls further enabling and/or disabling communication with a server. In addition, certain data may be treated in one or more ways before it is stored or used so that personally identifiable information is removed. Thus, the user 106 is provided with control over what information is collected about the user 106, how that information is used, and what information is provided to the user 106.

Figure 3:
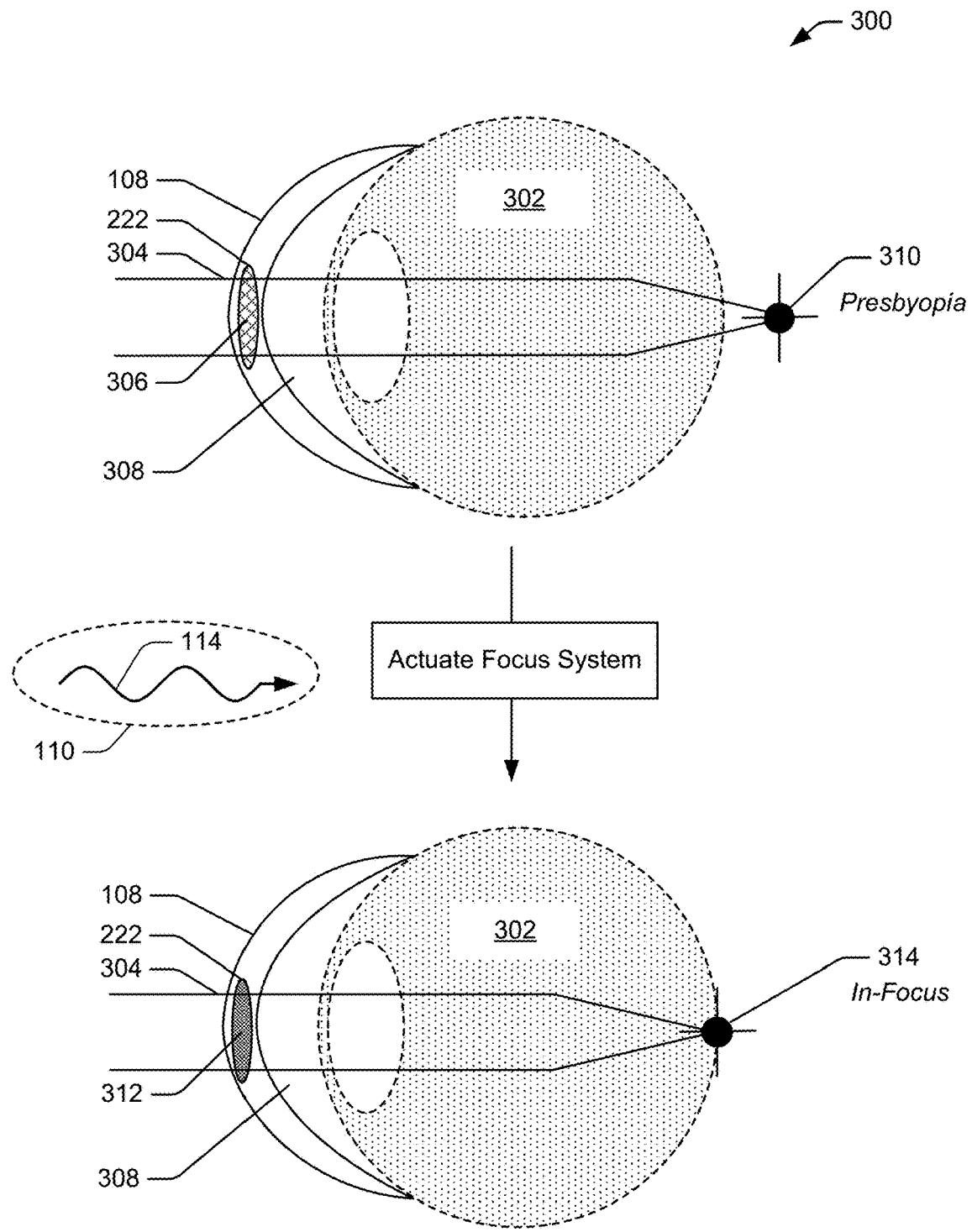
FIG. 3 illustrates example details of actuating a focus system of a contact lens in accordance with one or more aspects.

FIG. 3 illustrates example details 300 of actuating a focus system of a contact lens in accordance with one or more aspects. The contact lens may be the contact lens 108 of FIG. 1 using the focus system 222 of FIG. 2. An example embodiment of the focus system 222, as illustrated in FIG. 3, includes a bladder filled with a polymer gel. FIG. 3 illustrates the focus system 222 being actuated to alleviate a presbyopia condition (e.g., far-sightedness) being experienced by the user 106 of FIG. 1.

As illustrated, an eye 302 (e.g., of the user 106) is receiving light waves 304 of an image (e.g., the image 104) being presented by a user equipment (e.g., the UE 102). Optical properties of an optical network, including the contact lens 108, the focus system 222 (e.g., the bladder having a polymer gel in a first state having a first refractive index 306), and a cornea 308 of the eye 302, focus the light waves 304 at focal point 310. The focal point 310, at a location "behind" the retina of the eye 302, corresponds to the presbyopia condition.

As illustrated by FIG. 3, a signal (e.g., the signal 110 including mmWave(s) 114) is received by the contact lens 108 (e.g., the mmWave antenna 224, the transceiver circuitry 228). In response, the contact lens 108 (e.g., the logic circuitry 230 executing code of the focus manager application 234) actuates the focus system 222 (e.g., electrically stimulates the polymer gel to induce a second state having a second refractive index 312). The optical properties of the optical network, including the contact lens 108, focus the light waves 304 at focal point 314. The focal point 314 changes to a location that is proximate the retina of the eye 302 and corresponds to an in-focus condition.

Figure 4:
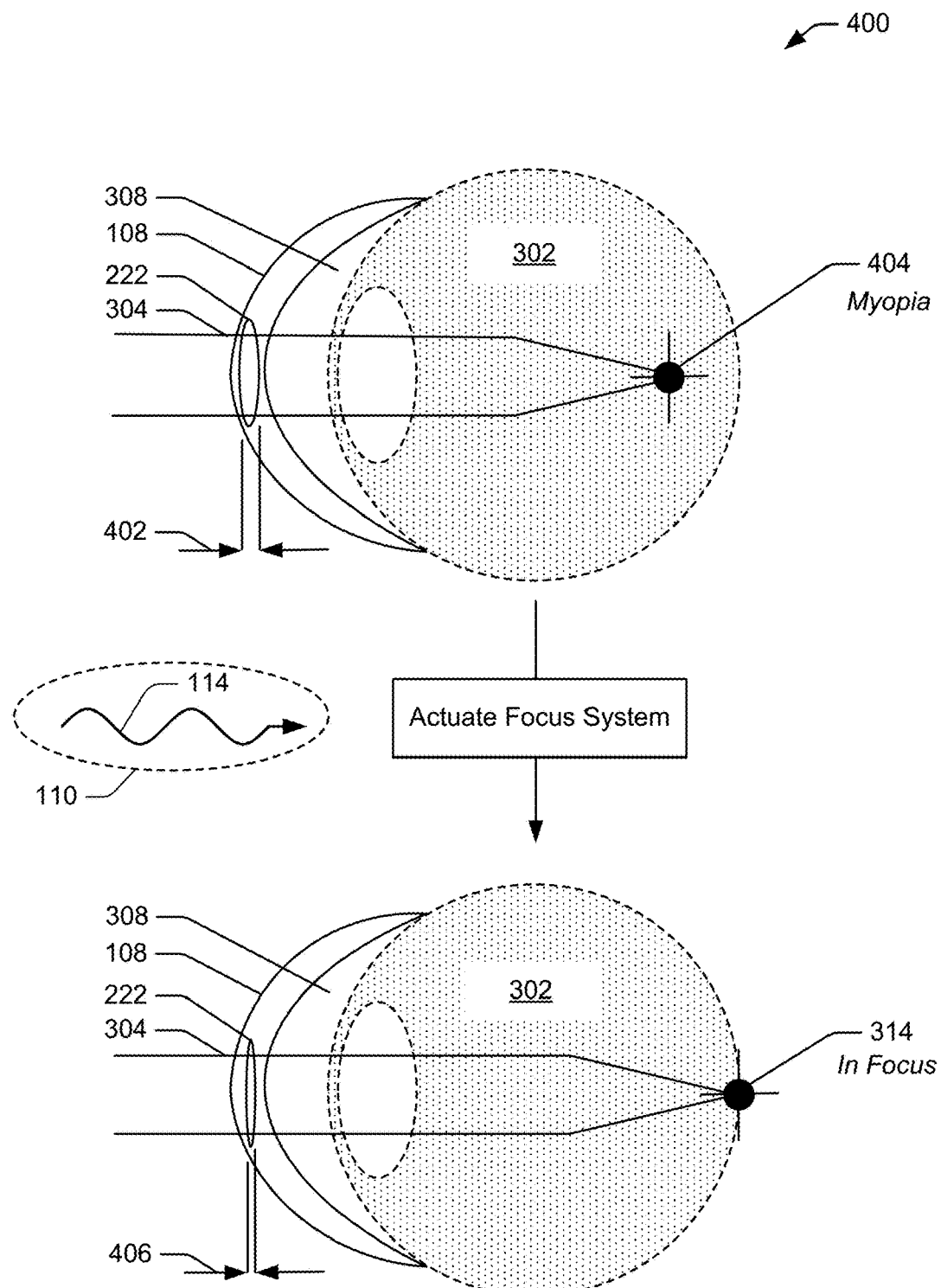
FIG. 4 illustrates other example details of actuating a focus system of a contact lens in accordance with one or more aspects.

FIG. 4 illustrates example details 400 of actuating a focus system of a contact lens in accordance with one or more aspects. The contact lens may be the contact lens 108 of FIG. 1 using the focus system 222 of FIG. 2. An example embodiment of the focus system 222, as illustrated in FIG. 4, includes a bladder formed from a polymer film FIG. 4 illustrates the focus system 222 being actuated to alleviate a myopia condition (e.g., near-sightedness) being experienced by the user 106 of FIG. 1.

As illustrated, the eye 302 is receiving the light waves 304. Optical properties of an optical network, including the contact lens 108, the focus system 222 (e.g., the bladder in a first state having a first dimension 402), and a cornea 308 of the eye 302, focus the light waves 304 at focal point 404. The focal point 404, at a location "in front of" the retina of the eye, corresponds to the myopia condition.

As illustrated by FIG. 4, a signal (e.g., the signal 110 including mmWave(s) 114) is received by the contact lens 108 (e.g., the mmWave antenna 224, the transceiver circuitry 228). In response, the contact lens 108 (e.g., the logic circuitry 230 executing code of the focus manager application 234) actuates the focus system 222 (e.g., electrically stimulates the polymer film of the bladder to induce a second state having a second dimension 406). The optical properties of the optical network, including the contact lens 108, focuses the light waves 304 at focal point 314. The focal point 314 changes to a location that is proximate the retina of the eye 302 and corresponds to an in-focus condition.

Example Methods

Figure 5:
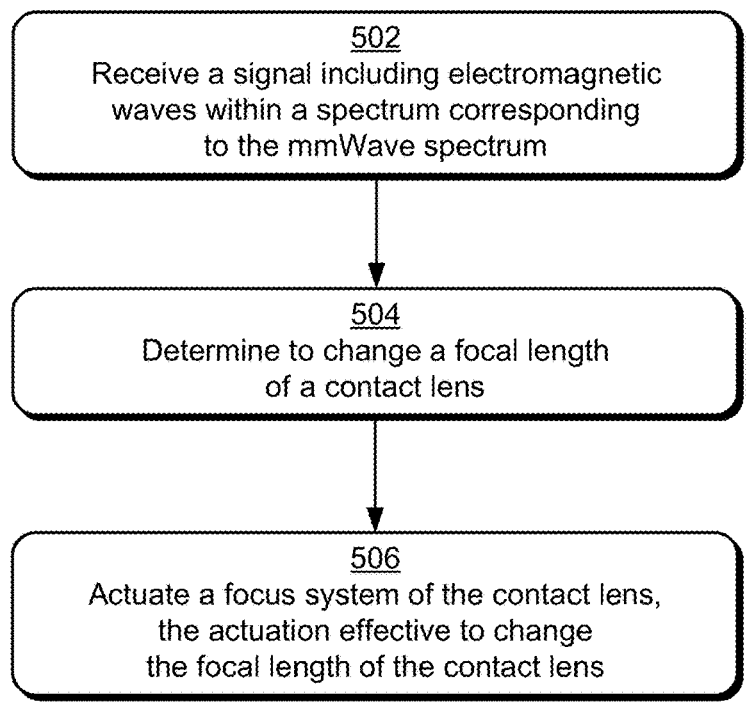
FIG. 5 illustrates an example method performed by a contact lens having a focus system in accordance with one or more aspects.

FIG. 5 illustrates an example method 500 performed by a contact lens having a focus system in accordance with one or more aspects. The contact lens (e.g., the contact lens 108 of FIG. 1, using elements of FIGS. 2-4) is directed to perform the method 500 by logic (e.g., the logic circuitry 230) executing code of a focus manager application (e.g., the focus manager application 234). Operations of the method 500 are described in a series of blocks 502-506 and are not limited to the order or sequence as described below.

At block 502, the contact lens 108 receives, from a user equipment (e.g., the UE 102), a signal (e.g., the signal 110) including electromagnetic waves (e.g., the mmWave(s) 114) that are within a spectrum corresponding to millimeter-wave spectrum.

At block 504, and in response to receiving the signal 110 including the electromagnetic waves, the contact lens 108 determines to change a focal length of the contact lens 108.

At block 506, and in response to determining to change the focal length of the contact lens, the contact lens 108 actuates a focus system (e.g., the focus system 222) of the contact lens 108. Actuating the focus system 222 changes the focal length of the contact lens. Changing the focal length of the contact lens 108 may change a location of a focal point of the image 104 within an eye (e.g., the eye 302) of a user (e.g., the user 106) wearing the contact lens 108.

In some instances, the method 500 may change the location of the focal point of the image 104 in the eye 302 of the user 106 to overcome a presbyopia condition of the user 106. In other instances, the method 500 may change the location of the focal point of the image 104 in the eye 302 of the user 106 to overcome a presbyopia condition.

In some instances of method 500, the signal 110 including the electromagnetic wave(s) 114 may be a beamformed signal. The signal 110 may carry data that indicates, to the contact lens 108, an estimated distance between the UE 102 and the contact lens 108 and/or qualities of a display (e.g., the display 206) of the UE 102. In such instances, actuating the focus system 222 at block 506 may include actuating the focus system 222 to one of multiple, available degrees of actuation based on the estimated distance. The signal 110 may also carry data that includes an identifier associated with the UE 102 such that the contact lens 108 may determine that the signal 110 originates from the UE 102 (e.g., the contact lens 108 may not determine to change the focal length of the contact lens if such an identifier is not included).

Figure 6:
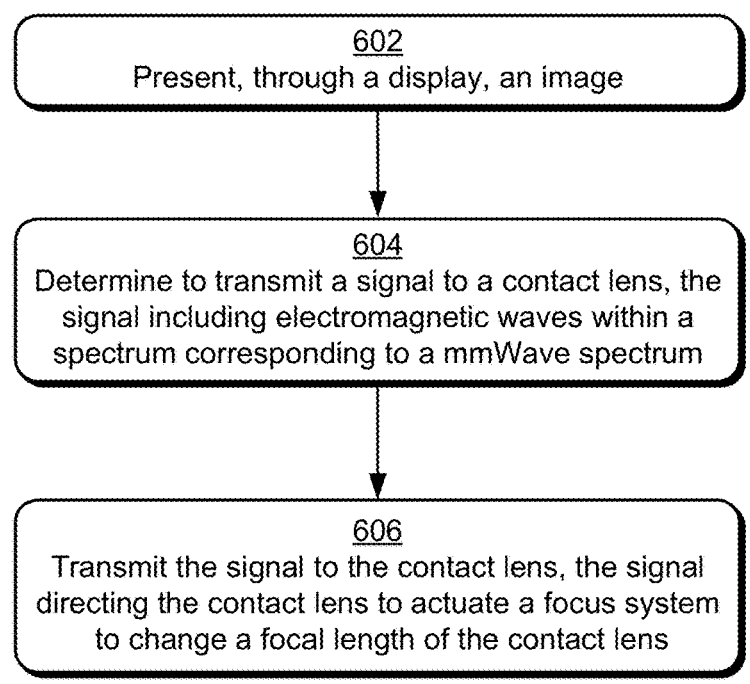
FIG. 6 illustrates an example method performed by a user equipment in accordance with one or more aspects.

FIG. 6 illustrates an example method 600 performed by a user equipment in accordance with one or more aspects. The user equipment (e.g., the UE 102 of FIG. 1, using elements of FIGS. 2-4) is directed to perform the method 600 by a processor (e.g., the processor 208) executing code of a focus assistant manager application (e.g., the focus assistant manager application 214). Operations of the method 600 are described in a series of blocks 602-606 and are not limited to the order or sequence as described below.

At block 602, the UE 102 presents, through a display (e.g., the display 206), an image (e.g., the image 104).

At block 604, the UE 102 (e.g., the processor 208 executing the code of the focus assistant manager application 214) determines to transmit a signal (e.g., the signal 110) to a contact lens (e.g., the contact lens 108). The signal 110 includes electromagnetic waves (e.g., mmWave 114) within a spectrum corresponding to a millimeter-wave spectrum.

At block 606, the UE 102 transmits the signal to the contact lens 108. Transmitting the signal 110 to the contact lens 108 causes the contact lens 108 to actuate a focus system (e.g., the focus system 222) that changes a focal length of the contact lens 108. Changing the focal length of the contact lens 108 may change a location of a focal point of the image 104 within an eye (e.g., the eye 302) of a user (e.g., the user 106) wearing the contact lens 108.

In some instances of method 600, determining to transmit the signal 110 may be in response to determining that the image 104 is associated to a type of viewer application (e.g., the viewer application 212) that is executing on the UE 120. For example, the viewer application 212 may be a type of viewer application that is a magnifier application or an e-reader application.

In other instances of method 600, determining to transmit the signal 110 may be in response to determining that the user 106 is gazing at the image 104. Determining that the user 106 is gazing at the image 104 may include recognizing the user 106 through facial-recognition, recognizing a gesture using a radar reflection, receiving another signal from the contact lens 108, or detecting a change in an orientation of the UE 102.

The method 600 may also include additional operations. As an example, UE 102 may change a magnification level, a resolution level, or a brightness level of the display 206. In some instances, changing the magnification level, the resolution level, or the brightness level may be based on known eyesight capabilities of the user 106 (e.g., the eyesight capabilities of the user 106 may be stored in the CRM 210 and known by the UE 120).

Variations

There are many variations and permutations of the above-described systems and techniques. As a first example, an as opposed to the contact lens 108, the techniques can apply to a wearable optics system that includes a focus system (e.g., the focus system 222). Such a wearable optics system may be a heads-up display, augmented-reality goggles, reading glasses, and so on. As a second example, and as opposed to receiving a signal from the UE 102, the contact lens 108 may receive a reflection of a millimeter-wave signal that the contact lens 108 transmits (e.g., the contact lens 108 may be equipped with a radar system to detect an object and actuate the focus system 222).

The following paragraphs recite several examples:

Example 1: A contact lens comprising: a focus system; an antenna; and circuitry including: transceiver circuitry; logic circuitry; and memory circuitry storing instructions of a focus manager application that when executed by the logic circuitry, directs the contact lens to: receive, through the antenna and transceiver circuitry and from a user equipment, a signal including electromagnetic waves, the electromagnetic waves in a spectrum that corresponds to a millimeter-wave spectrum; determine, in response to receiving the signal including the electromagnetic waves, to change a focal length of the contact lens; and actuate, in response to determining to change the focal length of the contact lens, the focus system, the actuation effective to change the focal length of the contact lens.

Example 2: The contact lens as recited by example 1, wherein: the focus system includes a bladder filled with a polymer gel; and actuating the focus system includes applying an electrical stimulation to the polymer gel to induce a change to a refractive index of the polymer gel.

Example 3: The contact lens as recited by example 1, wherein the focus system includes a bladder formed from a polymer film; and actuating the focus system includes applying an electrical stimulation to the polymer film to induce a change in shape or dimension of the bladder.

Example 4: The contact lens as recited by any of examples 1 to 3, wherein the focus manager application directs the contact lens to actuate the focus system to correct a presbyopia condition.

Example 5: The contact lens as recited by any of examples 1 to 3, wherein the focus manager application directs the contact lens to actuate the focus system to correct a myopia condition.

Example 6: The contact lens, as recited by any of examples 1 to 5, wherein the focus manager application further directs the contact lens to determine an estimated distance between the contact lens and the user equipment based on data included in the electromagnetic waves.

Example 7: The contact lens as recited by example 6, wherein the focus manager application directs the contact lens to actuate the focus system to one of multiple, available degrees of actuation based on the determined, estimated distance.

Example 8: The contact lens as recited by example 1, wherein the memory circuitry stores parameters that indicate eyesight capabilities of the user.

Example 9: A user equipment, the user equipment comprising: a display; a processor; and computer-readable media storing instructions of a focus assistant manager application that, when executed by the processor, directs the user equipment to: present, through the display, an image; determine to transmit a signal to a contact lens, the signal including electromagnetic waves within a spectrum that corresponds a millimeter-wave spectrum; and transmit the signal to the contact lens, the signal directing the contact lens to actuate a focus system of the contact lens to change a focal length of the contact lens.

Example 10: The user equipment as recited by example 9, wherein the focus assistant manager application directs the user equipment to transmit the signal in response to determining that the image is associated with a type of viewer application that is executing on the user equipment.

Example 11: The user equipment as recited by example 10, wherein the type of viewer application include a magnifier application or an e-reader application.

Example 12: The user equipment as recited any of examples 9 to 11, wherein the user equipment includes a gaze-detection system and the focus assistant manager application directs the user equipment to transmit the signal further in response to determining that the user is gazing at the image.

Example 13: The user equipment as recited by example 12 wherein the gaze-detection system includes an accelerometer and/or gyroscope to detect motion, a near-field communication device or proximity sensor to detect a presence of the user, or an image-capture sensor for facial recognition.

Example 14: The user equipment as recited by example 12, wherein the gaze-detection system includes a radar system for gesture recognition.

Example 15: The user equipment as recited by any of examples 9 to 14, wherein the focus assistant manager application further directs the user equipment to change a magnification level, a resolution level, or a brightness level of the display based on eyesight capabilities of the user.

Example 16: The user equipment as recited by example 15, wherein the focus assistant manager application directs the user equipment to receive the eyesight capabilities of the user from the contact lens or a medical service provider.

Example 17: The user equipment as recited by any of examples 9 to 16, wherein the focus assistant manager application further directs the UE to beamform the signal in a desired direction and to a desired attenuation distance.

What is claimed is:

1. A contact lens comprising:
a focus system;
an antenna; and circuitry including:
   transceiver circuitry configured to receive wireless signals comprising electromagnetic waves within a spectrum that corresponds to a millimeter-wave spectrum;
   logic circuitry; and
   memory circuitry storing instructions of a focus manager that when executed by the logic circuitry, directs the contact lens to:
      determine, based on a data frame or a data packet carried by one of the wireless signals, an estimated distance between the contact lens and a user equipment from which the wireless signal originates, the data frame or data packet of the wireless signal indicating the estimated distance;
      determine, based on the estimated distance between the contact lens and the user equipment, to change a focal length of the contact lens; and
      actuate, in response to determining to change the focal length of the contact lens, the focus system effective to change the focal length of the contact lens.

2. The contact lens as recited by claim 1, wherein:
the focus system includes a bladder filled with a polymer gel; and
actuating the focus system includes applying an electrical stimulation to the polymer gel to induce a change to a refractive index of the polymer gel.

3. The contact lens as recited by claim 1, wherein:
the focus system includes a bladder formed from a polymer film; and
actuating the focus system includes applying an electrical stimulation to the polymer film to induce a change in shape or dimension of the bladder.

4. The contact lens as recited by claim 1, wherein the focus manager directs the contact lens to actuate the focus system to correct a presbyopia condition.

5. The contact lens as recited by claim 1, wherein the focus manager directs the contact lens to actuate the focus system to correct a myopia condition.

6. The contact lens as recited by claim 1, wherein the focus manager directs the contact lens to actuate the focus system to one of multiple, available degrees of actuation based on the estimated distance determined from the data frame or the data packet carried by the wireless signal.

7. The contact lens as recited by claim 1, wherein memory circuitry stores parameters that indicate eyesight capabilities of the user.

8. The contact lens as recited by claim 7, wherein determining to change the focal length of the contact lens is based, in part, on the parameters that indicate the eyesight capabilities of the user.

9. A user equipment, the user equipment comprising:
a display;
a processor;
and memory circuitry storing instructions of a focus assistant manager that, when executed by the processor, directs the user equipment to:
   present, through the display, an image;
   estimate a distance between the user equipment and a contact lens;
   determine to transmit a wireless signal to a contact lens to actuate a focus system of the contact lens; and
   transmit the wireless signal to the contact lens, the wireless signal carrying a data frame or data packet indicating the estimated distance between the user equipment and the contact lens and directing the contact lens to actuate the focus system of the contact lens to change a focal length of the contact lens based on the estimated distance, the wireless signal comprising electromagnetic waves within a spectrum that corresponds to a millimeter wave spectrum.

10. The user equipment as recited by claim 9, wherein the focus assistant manager directs the user equipment to transmit the wireless signal in response to determining that the image is associated with a type of viewer application that is executing on the user equipment.

11. The user equipment as recited by claim 10, wherein the type of viewer application is a magnifier application.

12. The user equipment as recited by claim 9, wherein the user equipment includes a gaze-detection system and the focus assistant manager directs the user equipment to transmit the wireless signal further in response to determining that the user is gazing at the image.

13. The user equipment as recited by claim 12, wherein the gaze-detection system includes an accelerometer and/or gyroscope to detect motion, a near-field communication device or proximity sensor to detect a presence of the user, or an image-capture sensor for facial recognition.

14. The user equipment as recited by claim 9, wherein:
the user equipment further comprises a radar system for gesture recognition; and
the focus manager directs the user equipment to estimate, using the radar system of the user equipment, the distance between the user equipment and the contact lens.

15. The user equipment as recited by claim 9, wherein the focus assistant manager further directs the user equipment to change a magnification level, a resolution level, or a brightness level of the display based on eyesight capabilities of the user.

16. The user equipment as recited by claim 15, wherein the focus assistant manager directs the user equipment to receive the eyesight capabilities of the user from the contact lens or a medical service provider.

17. The user equipment as recited by claim 9, wherein determining to transmit the wireless signal to the contact lens includes determining a direction of transmission by which to beamform the wireless signal toward the contact lens.

18. The user equipment as recited by claim 9, wherein determining to transmit the wireless signal to the contact lens as a wireless signal includes determining an attenuation distance for the beamformed signal.

19. The user equipment as recited by claim 10, wherein the type of viewer application is an e-reader application.

20. The user equipment as recited by claim 9, wherein:
the wireless signal transmitted by the user equipment carries an additional data frame or an additional data packet that indicates parameters comprising at least two of:
   a model of the user equipment;
   a configuration of the user equipment;
   an available transmit power of the user equipment;
   a resolution of the display of the user equipment;
   an illumination power of the display of the user equipment; or
   available formats of the image presented via the display of the user equipment; and
the wireless signal further directs the contact lens to actuate the focus system of the contact lens to change the focal length of the contact lens based on the estimated distance and the parameters of the additional data frame or the additional data packet.

\* \* \* \* \*

UNITED STATES PATENT AND TRADEMARK OFFICE
CERTIFICATE OF CORRECTION

PATENT NO. : 12,001,603 B2
APPLICATION NO. : 17/096072
DATED : June 4, 2024
INVENTOR(S) : Sean Patrick Korphi, Mohammad Reza Ghajar and Fei He Page 1 of 1

It is certified that error appears in the above-identified patent and that said Letters Patent is hereby corrected as shown below:

In the Claims

Column 12, Line 48: After "as a" before "wireless", add --beamformed--

Signed and Sealed this
Twenty-fourth Day of December, 2024

Derrick Brent
*Acting Director of the United States Patent and Trademark Office*